(12) United States Patent
Stargardter et al.

(10) Patent No.: US 12,351,505 B2
(45) Date of Patent: Jul. 8, 2025

(54) ORIFICE PLATE CHANGE SYSTEM, GLASS FEEDING ASSEMBLY INCORPORATING AN ORIFICE PLATE CHANGE SYSTEM, AND METHODS

(71) Applicants: Paul Stargardter, Windsor, CT (US); Kenneth L. Bratton, Avon, CT (US)

(72) Inventors: Paul Stargardter, Windsor, CT (US); Kenneth L. Bratton, Avon, CT (US)

(73) Assignee: Emhart Glass S.A., Steinhausen (CH)

( * ) Notice: Subject to any disclaimer, the term of this patent is extended or adjusted under 35 U.S.C. 154(b) by 292 days.

(21) Appl. No.: 17/959,459

(22) Filed: Oct. 4, 2022

(65) Prior Publication Data

US 2023/0120137 A1 Apr. 20, 2023

Related U.S. Application Data

(60) Provisional application No. 63/256,314, filed on Oct. 15, 2021.

(51) Int. Cl.
*C03B 7/088* (2006.01)
*C03B 7/10* (2006.01)

(52) U.S. Cl.
CPC .............. *C03B 7/088* (2013.01); *C03B 7/10* (2013.01)

(58) Field of Classification Search
CPC ..................................................... C03B 7/088
See application file for complete search history.

(56) References Cited

U.S. PATENT DOCUMENTS

| | | | |
|---|---|---|---|
| 3,393,989 A | 7/1968 | Strausbaugh | |
| 3,760,993 A | 9/1973 | Meier | |
| 3,856,189 A | 12/1974 | Meier | |

FOREIGN PATENT DOCUMENTS

JP     H0826740 A     1/1996

*Primary Examiner* — Cynthia Szewczyk
(74) *Attorney, Agent, or Firm* — Reinhart Boerner Van Deuren P.C.

(57) ABSTRACT

A change system for changing an orifice plate that is registered with an orifice ring is provided. The orifice plate change system includes a guide arrangement, a plurality of orifice plates, and an actuator. The guide arrangement has a charging plate region and an operating plate region. Each orifice plate is configured to be slidably carried by the guide arrangement between the charging plate region and the operating plate region in which the orifice thereof is registered with the orifice ring orifice. A first orifice plate has a first orifice and a second orifice plate has a second orifice that is different than the first orifice such that a stream of molten glass that passes through the second is different than a stream of molten glass passing through the first orifice. The actuator translates the orifice plates from the charging plate region to the operating plate region.

22 Claims, 11 Drawing Sheets

ORIFICE PLATE CHANGE SYSTEM, GLASS FEEDING ASSEMBLY INCORPORATING AN ORIFICE PLATE CHANGE SYSTEM, AND METHODS

CROSS-REFERENCE TO RELATED PATENT APPLICATIONS

This patent application claims the benefit of U.S. Provisional Patent Application No. 63/256,314, filed Oct. 15, 2021, the entire teachings and disclosure of which are incorporated herein by reference thereto.

FIELD OF THE INVENTION

This invention generally relates to glass feeding assemblies for feeding molten glass to a shear assembly in the form of a stream of molten glass.

BACKGROUND OF THE INVENTION

Glass forming systems will use a glass feeding assembly to feed streams of molten glass to a shearing assembly that will shear the stream of molten glass to form a stream of gobs of glass. The molten glass will be feed from a spout holding the molten glass thorough one or more orifices to form the stream of molten glass with a desired physical configuration (e.g. shape and size).

Typically, the system will have a spout bowl arrangement that holds molten glass. The molten glass is collected within a reservoir of a spout bowl of the spout bowl arrangement and then passed through an orifice of an orifice ring of the spout bowl arrangement. The orifice of the orifice ring defines the final shape and size of the stream of molten glass prior to the stream passing through the shear assembly.

Over time, it can be desirable to change the orifice ring that defines the shape and size of the stream of molten glass. For example, it may be desirable to change the number of streams that are being formed by the glass feeding assembly, change the size or shape of the streams of glass and/or perform maintenance on the orifice ring.

In the past, changing the characteristics of the orifice of the orifice ring required manually removing the orifice ring. This would take significant time resulting in significant loss in productivity as well as expose the maintenance personnel to the dangerous high temperature glass and or components of the glass feeding assembly.

BRIEF SUMMARY OF THE INVENTION

Examples of the present disclosure provide improvements over the current state of the art as it relates to molten glass feeding systems. More particularly, examples of the present disclosure provide a new orifice plate and orifice plate change system that provide for change over from one orifice plate to another or from using only an orifice ring to using an orifice ring over an orifice ring. This can be done automatically such that the down time is substantially eliminated. Also, this can be done without exposing maintenance personnel to the dangers otherwise associated with replacement of an orifice ring.

In one example, an orifice plate change system for changing an orifice plate that is registered with a spout bowl arrangement is provided. The spout bowl arrangement, with which the orifice plate change system cooperates, has a first spout bowl arrangement orifice and a spout bowl arrangement sealing face surrounding the first spout bowl arrangement orifice. The spout bowl arrangement sealing face may face axially outward. The orifice plate change system includes a guide arrangement, a plurality of orifice plates, and an actuator. The guide arrangement has a charging plate region and an operating plate region. Each orifice plate has at least one orifice and an orifice plate sealing face configured to seal with the spout bowl arrangement sealing face. Each orifice plate is configured to be slidably carried by the guide arrangement and slidable relative to the guide arrangement between the charging plate region in which the orifice thereof is offset from the spout bowl arrangement orifice and the operating plate region in which the orifice thereof is registered with the spout bowl arrangement orifice. The plurality of orifice plates includes a first orifice plate having a first orifice and a second orifice plate having a second orifice. The second orifice is different than the first orifice such that a stream of molten glass that passes through the second orifice will have a different physical characteristic than a stream of molten glass passing through the first orifice. The actuator is configured to translate, operably, an orifice plate from the charging plate region to the operating plate region along a translation axis.

Typically, the charging plate region will be laterally offset from the spout bowl arrangement orifice and more typically offset from the spout bowl arrangement sealing face. The operating plate region will typically be aligned with the spout bowl arrangement orifice and the spout bowl arrangement sealing face.

In one example, the charging plate region has a charging plate support that acts on an orifice plate when the orifice plate is located within the charging plate region. The charging plate region provides a first biasing force generally orthogonal to the spout bowl arrangement sealing face to an orifice plate located within the charging plate region. The operating plate region has an operating plate support that acts on an orifice plate when the orifice plate is located within the operating plate region. The guide arrangement provides a second biasing force generally orthogonal to the spout bowl arrangement sealing face to an orifice plate located within the operating plate region. The second biasing force is parallel to and greater than the first biasing force. The second biasing force biases the orifice plate sealing face of the orifice plate located therein into abutment with the spout bowl arrangement sealing face.

In one example, the charging plate support is offset a first distance away from the spout bowl arrangement sealing face. The operating plate support is offset a second distance away from the spout bowl arrangement sealing face. The second distance is less than the first distance.

In one example, the charging plate support and operating plate support are formed by one or more shelves that have a support surface that faces towards the spout bowl arrangement and opposite a direction that molten glass exits the spout bowl arrangement orifice.

In one example, the guide arrangement includes first and second guide tracks that are laterally spaced apart. Each of the first and second guide tracks forms part of the charging plate support and part of the operating plate support. The first and second guide tracks straddle the spout bowl arrangement orifice.

In one example, each of the first and second guide tracks includes a fixed rail portion forming at least part of the charging plate support. Each of the first and second guide tracks includes a plurality of clamps forming at least part of the operating plate support. The clamps are adjustable.

In one example, the guide arrangement includes a discharged plate region. The operating plate region is positioned laterally between the charging plate region and the discharged plate region. The discharged plate region has a discharged plate support that acts on an orifice plate when the orifice plate is located within the discharged plate region. The discharged plate support is offset a third distance away from the spout bowl arrangement sealing face measured orthogonal to the spout bowl arrangement sealing face. The third distance is greater than the second distance. The orifice plates are removable from the guide arrangement from the discharged plate region.

In one example, an orifice plate stop may be positioned proximate the discharged plate region to prevent removal of an orifice plate from the discharged plate region until the orifice plate stop is moved to a released position.

In one example, when an orifice plate of the plurality of orifice plates is located within the operating plate region and another orifice plate of the plurality of orifice plates is located within the charging plate region, actuation of the actuator to translate the orifice plate within the charging plate region to the operating plate region biases the orifice plate within the charging plate region into the orifice plate within the operating plate region and pushes the orifice plate within the operating plate region out of the operating plate region.

In one example, if a third orifice plate is located within the discharged plate region, actuation of the orifice plate within the charging plate region also actuates the third orifice plate out of the discharged plate region. This occurs by the intermediate plate located within the operating plate region at the time of actuation pushing the third orifice plate out of the discharged plate region as the orifice plate within the operating plate region is transitioned into the discharged plate region.

In one example, the first orifice plate includes a plurality of first orifices offset from one another along a first orifice offset axis that is generally orthogonal to the translation axis. The second orifice plate includes a plurality of second orifices offset from one another along a second orifice offset axis that is generally orthogonal to the translation axis.

In one example a tapered region transitions between the offset distance provided by the charging plate support and offset distance provided by the operating plate support.

In one example, the plurality of clamps of each of the first and second guide tracks includes a first clamp. The first clamp is positioned adjacent the charging plate support. The first clamp has a tapered region that transitions between the offset distance provided by the charging plate support and offset distance provided by the operating plate support.

In one example, each orifice plate of the plurality of orifice plates includes a pan member and a plate member. The plate member defines the orifice. The pan member is interposed between the plate member and the guide arrangement. The pan member is slidable relative to the guide arrangement.

In one example, the pan member carries the plate member as the orifice plate within the guide arrangement.

In one example, each orifice plate has opposed first and second slide regions and a central region interposed between first and second slide regions. The orifice of the orifice plate extends through the central region. The first guide track slidably supports the first slide region and the second guide track slidably supports the second slide region.

In one example, each orifice plate has a first side that provides the sealing face and a second side opposed to the first side. The first slide region has a first thickness between the first and second sides. The second slide region has a second thickness between the first and second sides. The central region has a third thickness between the first and second sides. The third thickness is greater than the first and second thicknesses such that the first slide region and the central region form a stepped configuration and the second slide region and the central region form a stepped configuration.

In examples, the step configuration may include steps in the first side, the second side or both the second and first sides.

In one example, the second distance is adjustable to adjust a biasing force the operating plate region of the guide arrangement applies to an orifice plate located within the operating plate region biasing the orifice plate into sealing engagement with an spout bowl arrangement.

In one example, each orifice plate has a plurality of orifices. A number of the plurality of orifices is equal to a number of orifices in the spout bowl arrangement.

In one example, first orifice plate has a first number of orifices and the second orifice plate has a second number of orifices. The second number of orifices being different than the first number of orifices.

In one example, each orifice plate has a support member that carries an orifice member. The orifice member provides the orifice of the orifice plate. The support member provides portions of the first and second slide regions that engage the guide arrangement.

In an example, a glass feeding assembly for feeding a stream of molten glass to a shear assembly configured to shear the stream of molten glass into a stream of gobs of glass is provided. The glass feeding assembly includes a spout bowl arrangement and an orifice plate change system as outlined above. The spout bowl arrangement has a reservoir for holding molten glass. The spout bowl arrangement has at least one spout bowl arrangement orifice. The spout bowl arrangement has a spout bowl arrangement sealing face. For each orifice plate of the orifice plate change system, when the orifice plate is located within the operating plate region, the guide arrangement biases the orifice plate sealing face thereof into sealing engagement with the spout bowl arrangement sealing face.

In some embodiments, a plate may be provide that does not have any orifices therethrough. Such a plate can be used to stop the flow of molten glass through the at least one spout bowl arrangement orifice.

In one example, the assembly includes a flow control member positioned within the spout. The spout has an outlet. The flow control member is movable within the spout relative to the outlet to adjust the flow of molten glass through the outlet. The flow control member has a configuration in which the flow control member stops flow of molten glass from the spout and through the spout bowl arrangement and any registered orifice plate.

In one example, a flow control member within the spout can stop flow of molten glass through the spout bowl arrangement without requiring changing of the orifice plate that is registered with the spout bowl arrangement.

In one example, the spout bowl arrangement includes a spout and an orifice ring downstream thereof. The orifice ring defines an orifice ring orifice that provides the spout bowl orifice. The orifice ring defines, in some embodiments, the spout bowl arrangement sealing face in the form of an orifice ring sealing face. An orifice ring mounting pan carries the orifice ring and secures the orifice ring adjacent to the spout. The orifice ring mounting pan has an orifice ring support flange. Molten glass flows through the orifice ring orifice in a flow direction. The orifice ring has an orifice ring abutment facing opposite the flow direction. The orifice ring sealing face faces opposite the orifice ring abutment. The orifice ring abutment of the orifice ring axially abuts the orifice ring support flange of the orifice ring mounting pan. The guide arrangement of the orifice plate change system biases an orifice plate within the operating plate region into the orifice ring sealing face and biases the orifice ring abutment into axial abutment with the orifice ring support flange.

In one example, the orifice ring support flange is positioned between the spout and the orifice ring abutment.

Methods of using the orifice plate change system as well as the glass feeding assembly are also provided.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
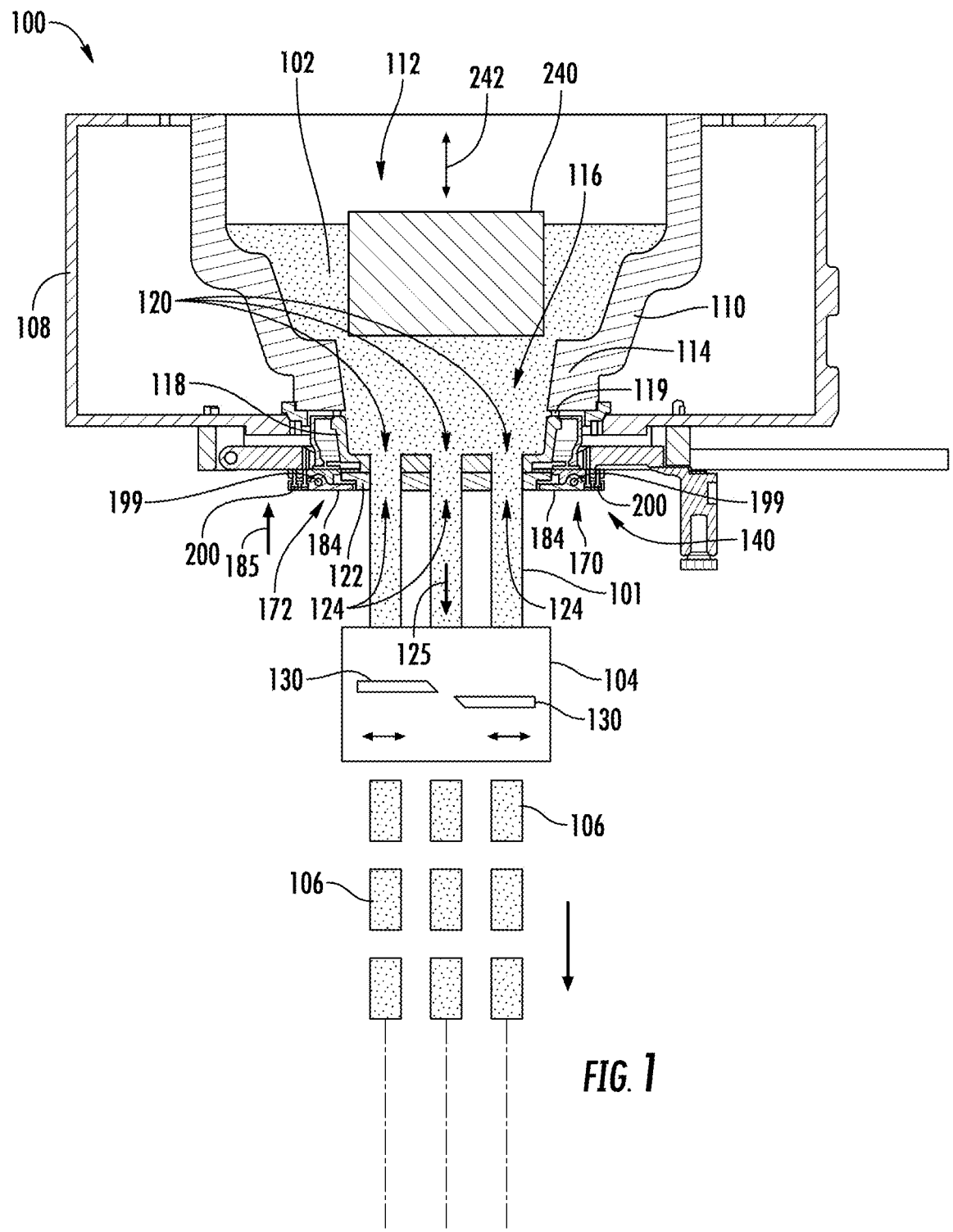
FIG. 1 is a simplified cross-sectional illustration of a glass feeding assembly and a shear assembly for forming glass gobs according to an example of the disclosure.
Figure 2:
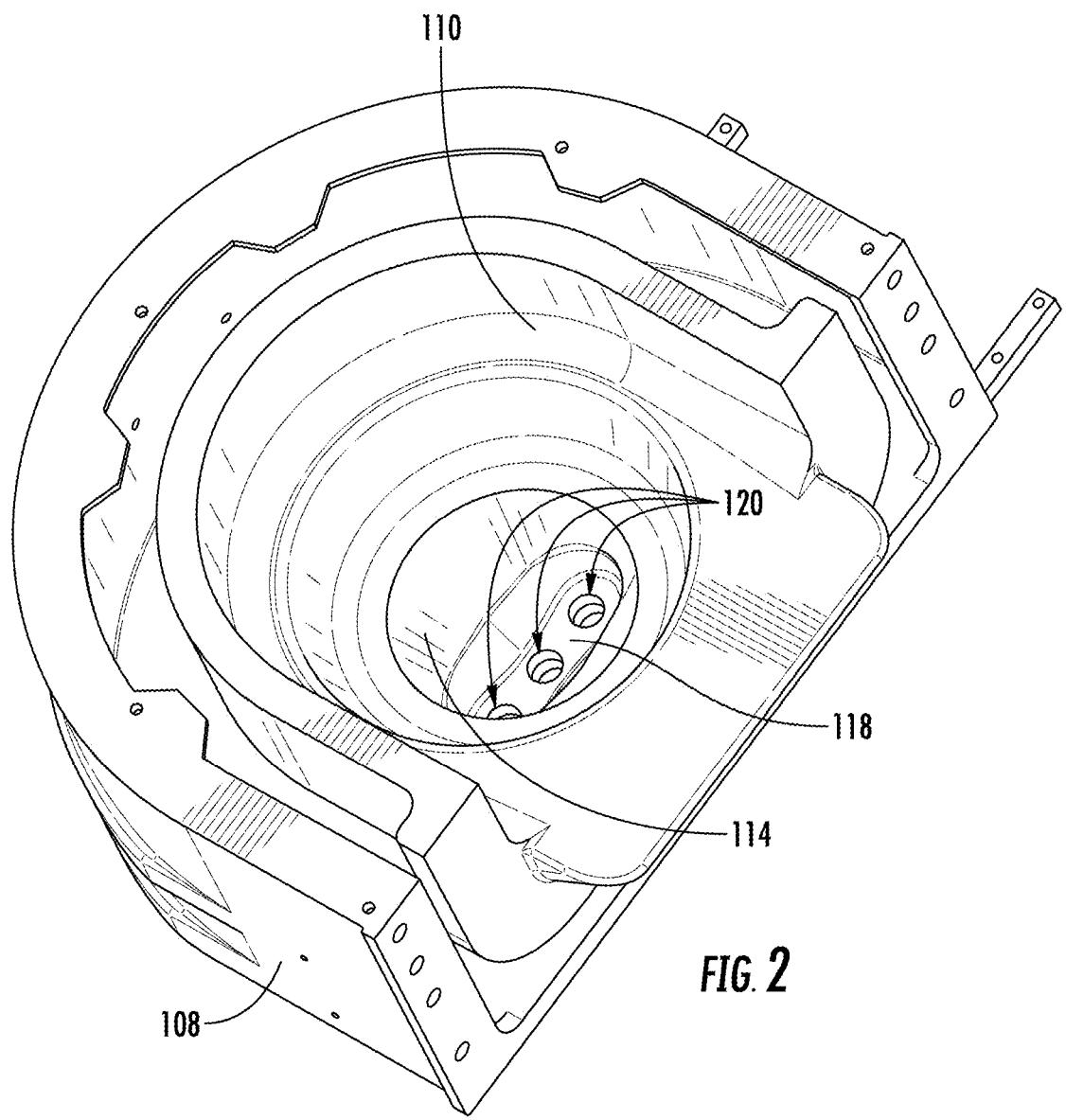
FIG. 2 is a partial top perspective view of the glass feeding assembly of FIG. 1.

FIG. 1 is a cross-sectional illustration that illustrates a glass feeding assembly 100 (also illustrated in FIGS. 2 and 3) feeding one or more streams 101 of molten glass 102 to a shear assembly 104 for forming gobs 106 of the molten glass 102.

The glass feeding assembly 100 includes a spout casing 108 that surrounds a spout bowl arrangement. The spout bowl arrangement in this embodiment is formed from several components, including a spout 110 and an orifice ring 118. However, in other embodiments, the spout bowl arrangement could have the spout 110 and orifice ring 118 formed as a continuous one-piece component. As such, features described below with reference to the spout or the orifice ring specifically could generically be features of a spout bowl arrangement depending on the particular implementation.

In this embodiment, the spout 110 that has a storage region 112 (also referred to herein as a reservoir) that collects or otherwise holds the molten glass 102. The spout 110 has a throat 114 that has an outlet orifice 116 that communicates with the orifice ring 118. Orifice ring seal 119 seals the orifice ring 118 to spout 110.

The orifice ring 118 has a plurality of orifice ring orifices 120 that initially form the molten glass 102. In this example, the orifice ring 118 has three orifice ring orifices 120. However, orifice rings can have more or less orifices 120. Further, orifice rings 118 can have different diameter or shaped orifice ring orifices 120.

An orifice plate 122 is located immediately downstream of the orifice ring 118. The orifice plate 122 is biased against an outer side of the orifice ring 118. The orifice plate 122 includes a plurality of orifice plate orifices 124 that align with and fluidly communicate with the orifice ring orifices 120. In this example, the orifice plate 120 has three orifice plate orifices 124 (one for each orifice ring orifice 120).

The orifice plate 122 and orifice plate orifices 124 thereof form the final shape of the stream 101 of molten glass 102 prior to the stream 101 being cut into gobs 106. Typically, the orifice plate orifices 124 will have a size (e.g. diameter) that is smaller, at least at an outlet thereof, than the outlet size of the orifice ring orifices 120.

Molten glass 102 flows through the orifices 120 and 124 generally in a flow direction illustrated by arrow 125.

The shear assembly 104 typically includes opposed shears 130 (illustrated schematically in FIG. 1) that cyclically move towards and away from one another to sever the streams 101 into gobs 106. The gobs 106 will then travel to downstream systems, such as bottle making apparatuses such as molds.

The orifice plate 122 is part of an orifice plate change system 140 that allows for replacement of the orifice plate 122 as well as that secures the orifice plate 122 in sealing abutment with the orifice ring 118. The orifice plate change system 140 is better illustrated in FIG. 3.

In addition to orifice plate 122 that is in registration with the orifice ring 118, which is also referred to as an operating plate, the orifice plate change system 140 includes an unused orifice plate 142 and optionally a used orifice plate 144. The orifice plate change system 140 is used to quickly and easily change the orifice plate that is in registration with the orifice ring 118. Changing the orifice plate that is in registration with the orifice ring 118 can be done to change: the number of orifices that are in use forming the streams 101 of molten glass 102, the diameter of one or more orifices that are forming the streams 101 of molten glass 102, the shape of one or more orifices that are forming the streams 101 of molten glass 102, combinations thereof, or simply for maintenance purposes. In some instances, a stop plate may be provided that is free of any orifices to stop the flow of molten glass 102.

In the illustrated example, each orifice plate 122, 142, 144 has three orifice plate orifices. The orifice plate orifices are laterally spaced apart in a direction generally perpendicular to axis 158. However, other angles can be used. Further, the number of orifice plate orifices of the orifice plates 122, 142, 144 is equal to the number of orifice ring orifices of the orifice ring 118. However, in other embodiments, various ones of the orifice plates may have a different number of orifice plate orifices. Further, the orifice plates may have a different number of orifice plate orifices than the number of orifice ring orifices in the orifice ring. For example, the orifice ring could have a single orifice while an associated orifice plate could have a plurality of orifices.

In this example, the orifice plate change system 140 includes a guide arrangement 146 that operably carries the plurality of orifice plates, e.g. orifice plates 122, 142, 144. In this example, the orifice plates are slidably carried in the guide arrangement.

In this example, the guide arrangement 146 defines a charging plate region 148, an operating plate region 150 and (optionally) a discharged plate region 152.

Unused plate(s) 142 that is next to be registered with the orifice ring 118 is located in the charging plate region 148. Operating plate 122 is located within the operating plate region 150. The most recently used plate 144 is located within the discharged plate region 152. In other examples, used plates may simply be expelled from the orifice plate change system 140 and no discharged plate region 152 may be provided.

Figure 3:
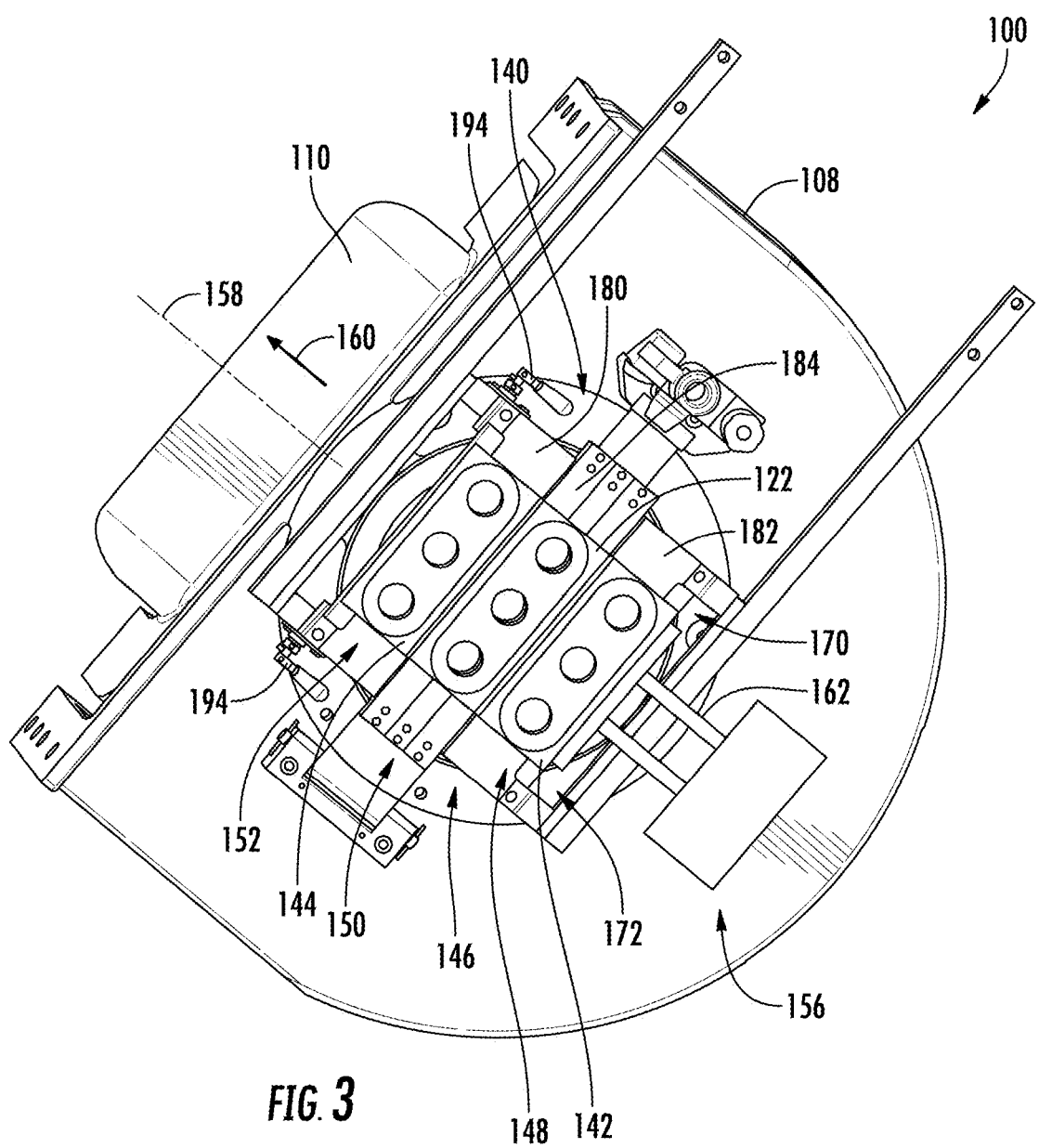
FIG. 3 is a partial bottom perspective view of the glass feeding assembly of FIG. 1.

An actuator 156, illustrated schematically in FIG. 3, pushes the plates 122, 142, 144 along a translation axis 158, as illustrated schematically by arrow 160, from the charging plate region 148, to the operating plate region 150 and then to the discharged plate region 152 or alternatively directly out of the guide arrangement 146.

The actuator 156 can take many forms, such as hydraulic or pneumatic cylinders as well as screw driven actuators such as lead or ball screw actuators, but preferably takes a form that quickly transitions the plates in the charging plate region 148 to the operating plate region 150, and preferably in less than 1 second. A quick transfer from one plate to another can prevent significant, if any, interference with the glass feeding system 100 or with downstream operations.

In this example, the actuator 156 includes a plunger 162 that directly acts on unused orifice plate 142. The actuator 156 pushes orifice plate 142 along axis 158 and into orifice plate 122, which is pushed into orifice plate 144. When the actuator pushes orifice plate 142 out of the charging plate region 148 and into the operating plate region 150, orifice plate 122 will likewise be pushed out of the operating plate region 150.

Figure 6:
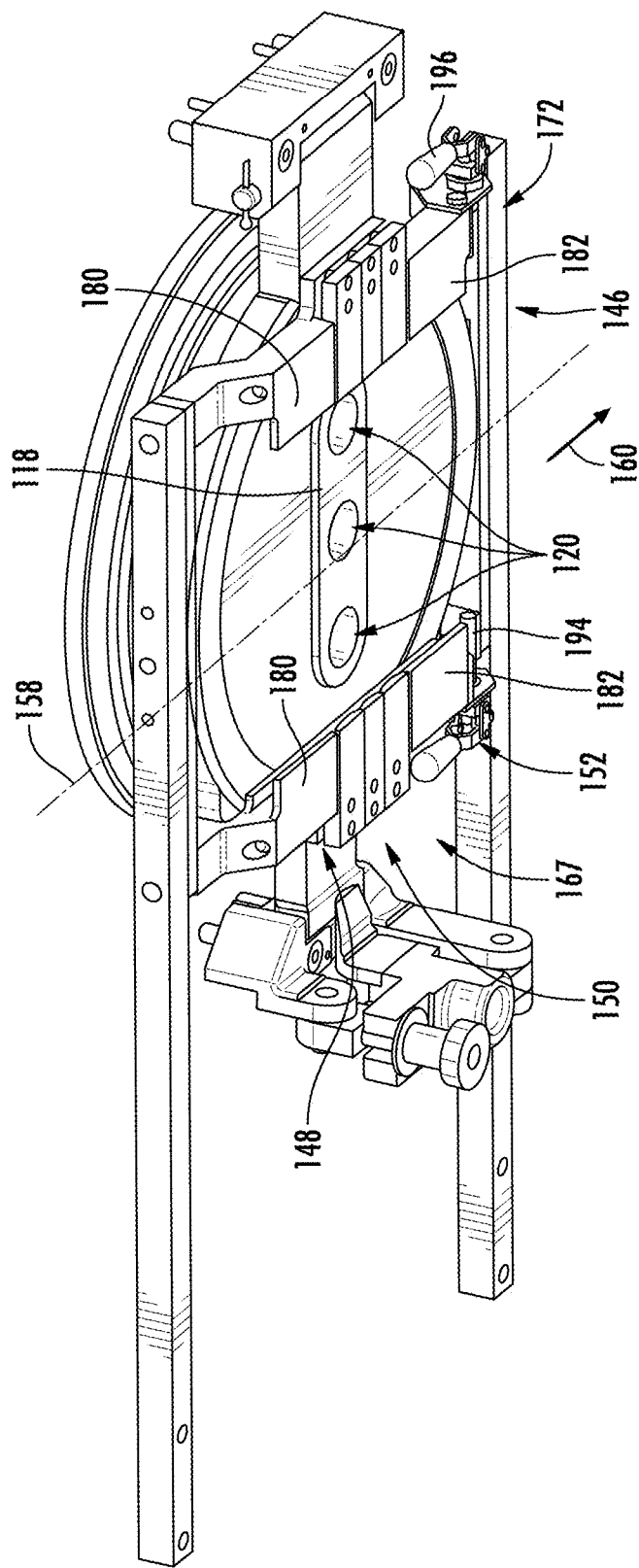
FIG. 6 is a perspective view of the guide arrangement positioned adjacent an orifice ring and an orifice ring mounting arrangement with the orifice plates removed therefrom.

In this example, the guide arrangement 146 includes first and second guide tracks 170, 172. The first and second guide tracks 170, 172 are laterally spaced apart and straddle axis 158 as well as the orifice ring orifices 120 (see e.g. FIG. 6).

The first and second guide tracks 170, 172 will be described with reference to FIGS. 4 and 5. However, only first guide track 170 will be described as the two guide tracks are substantially mirror images of one another.

First guide track 170 forms a charging plate support 174 that corresponds, at least in part to the charging plate region 148, an operating plate support 176 that corresponds, at least in part to the operating plate region 150, and a discharged plate support 178 that corresponds, at least in part to the discharged plate region 152.

Figure 4:
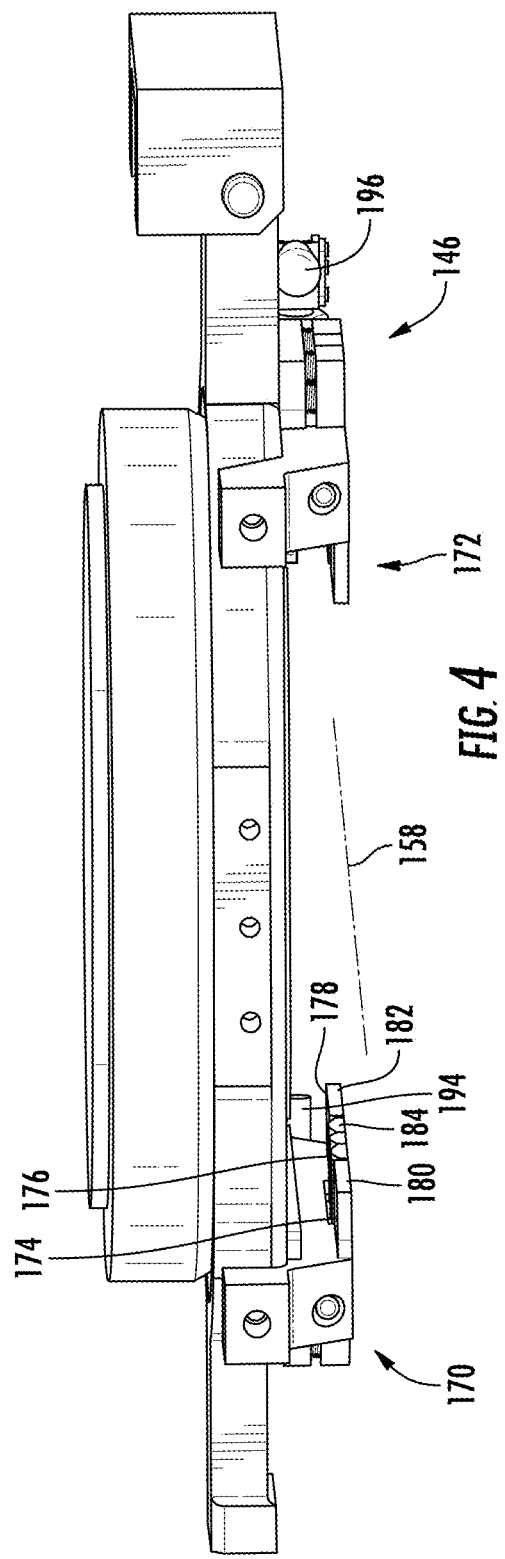
FIG. 4 is a partial perspective view of a orifice plate guide arrangement of an orifice plate change system of the glass feeding assembly of FIG. 1.

As better illustrated in FIG. 4, the guide tracks 170, 172 form a shelf that, in this embodiment, is a stepped shelf.

The charging plate support 174 and discharged plate support 178 portions of the first and second guide tracks 170, 172 include fixed rail portions 180, 182. The operating plate support 176 portion of the first and second guide tracks 170, 172 include a plurality of clamps 184.

The guide arrangement 146 is configured to support the orifice plates. In particular, the guide arrangement 146 biases or otherwise supports the orifice plates 122, 142, 144 in a direction illustrated by arrow 185 in FIGS. 1 and 5.

In the illustrated embodiment, the guide arrangement 146 provides a different level of biasing force in the charging plate region 148 with the charging plate support 174 than in the operating plate region 150 with the operating plate support 176.

Figure 5:
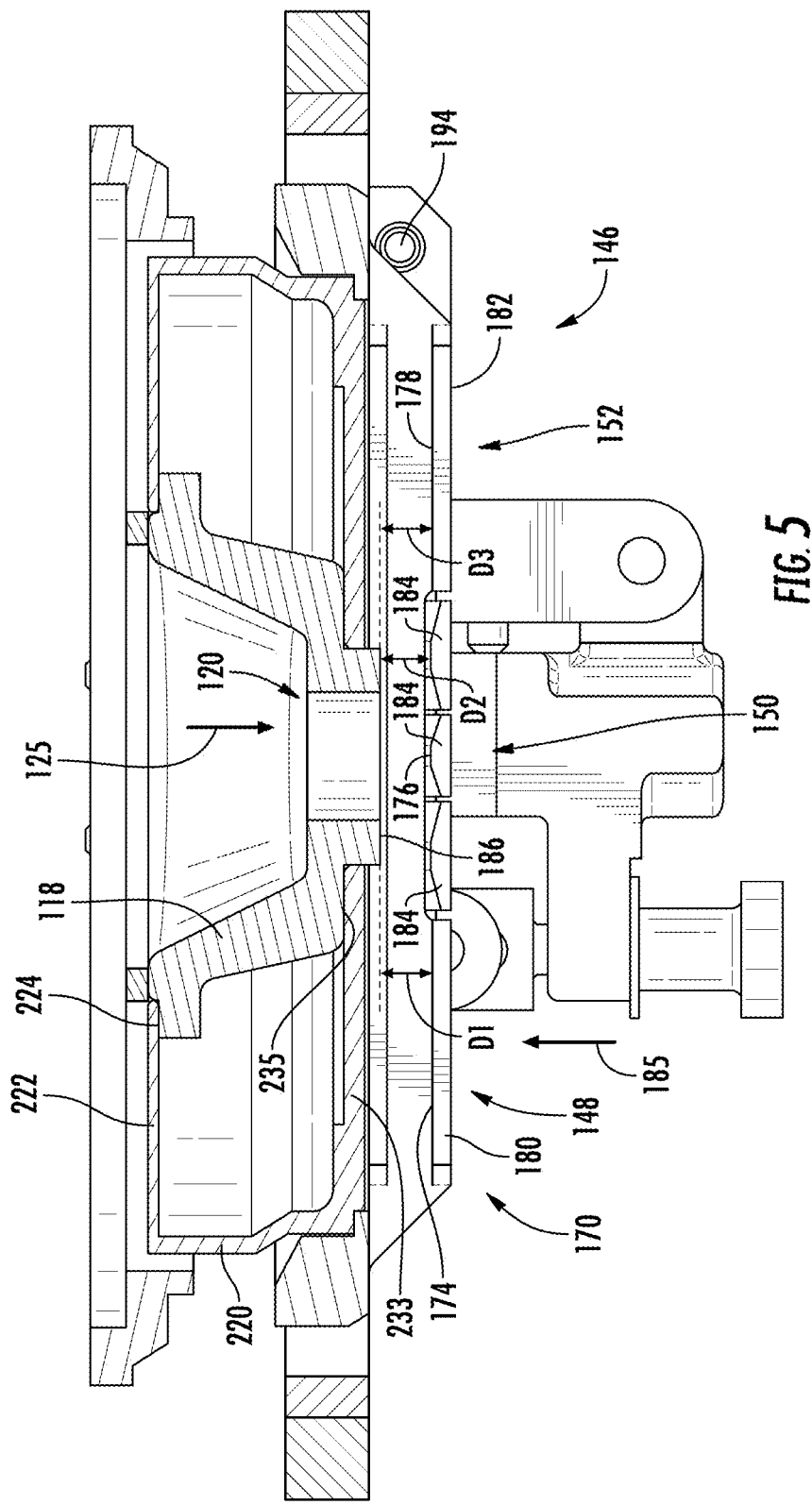
FIG. 5 is a cross-sectional illustration of the orifice plate guide arrangement of FIG. 4 positioned adjacent an orifice ring of the glass feeding assembly of FIG. 1.
Figure 7:
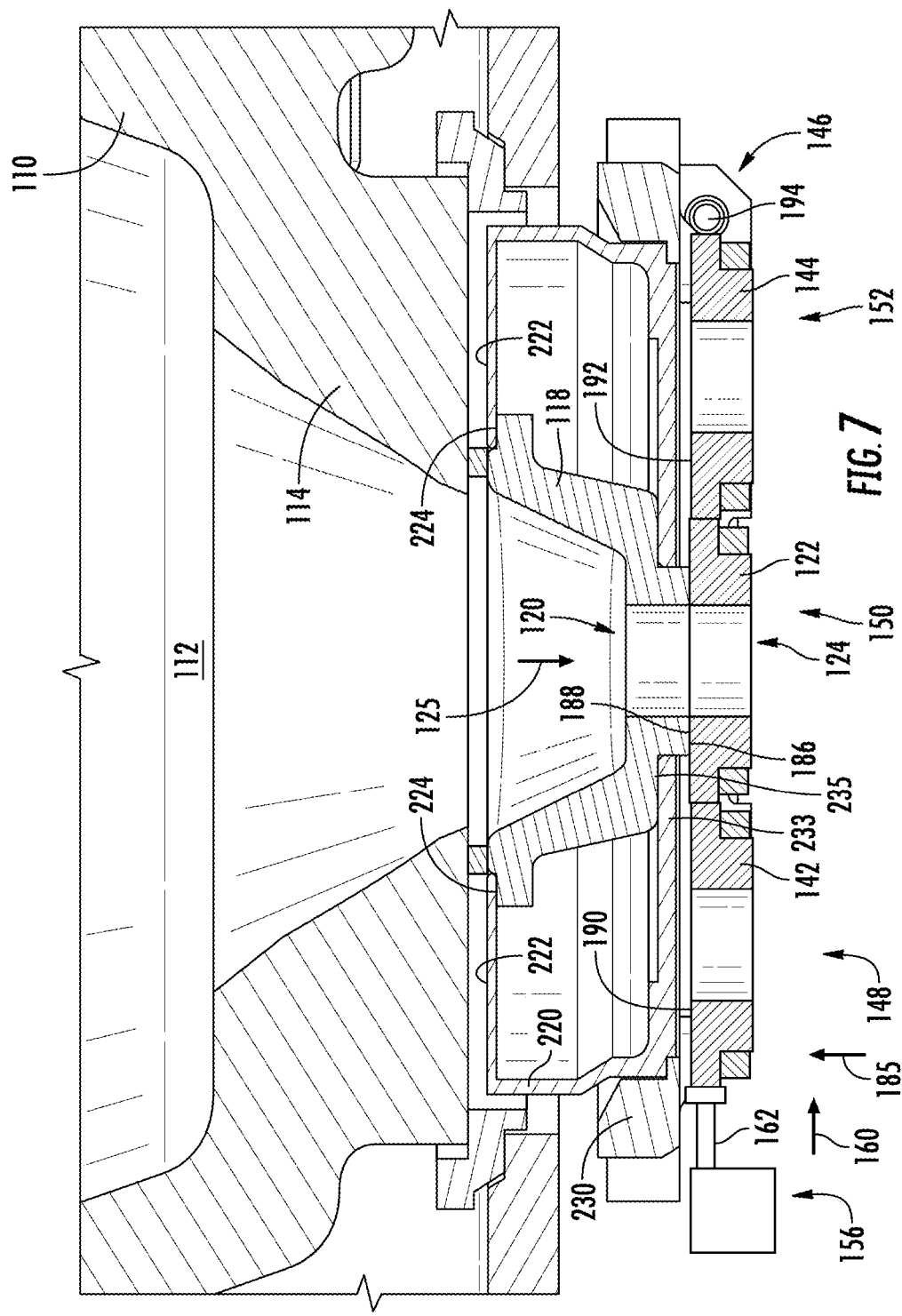
FIG. 7 is a partial, enlarged, cross-sectional illustration of the glass feeding assembly of FIG. 1.

With particular reference to FIGS. 5 and 7, the orifice ring 118 provides an orifice ring sealing face 186 that surrounds the orifice ring orifices 120 and against which an orifice plate sealing face 188, 190, 192 of the orifice plates 122, 142, 144 is axially biased to seal the two components to one another when the orifice plates 122, 142, 144 are registered with the orifice ring 118 with the orifice plate orifices in fluid communication with the orifice ring orifices 120.

Biasing forces provided by the guide arrangement 146 illustrated by arrow 185 are generally orthogonal to this orifice ring sealing face 186. The biasing force provided by the operating plate support 176 biases the orifice plate 122, 142, 144 positioned therein into axial abutment with the orifice ring sealing face 186.

The different levels of biasing force can make it easier to transition the orifice plates between the various regions of the guide arrangement 146 thus allowing the transition to occur with lower actuator force.

With reference to FIG. 5, the charging plate support 174 is offset a first distance D1 from the end of the orifice ring 118 that define the orifice ring sealing face 186 and the operating plate support 176, e.g. provided by clamps 184, is offset from the end of the orifice ring 118 that defines the orifice ring sealing face 186 a second distance D2. The different offset values provides the different biasing force that is provided by the different regions.

More particularly, the charging plate support 174 and operating plate support 176 are axially stepped configuration that is the difference between distances D1 and D2.

In this embodiment, the discharged plate support 178 is offset a distance D3 from the orifice ring sealing face 186. This distance D3 is greater than the distance D2, again such that any axial biasing force provided by the discharged plate support 178 is less than that provided by the operating plate support 176. Distance D3 may be the same, greater or smaller than distance D1. In some instances, the biasing force provided in the charging plate region and the discharged plate region are simply the force of gravity required to support the orifice plates in those regions. For instance, the orifice plates in those regions may not be biased into the orifice ring. In such an arrangement, a gap may be above the orifice plates in those regions such that the upper surface, or surface facing the spout bowl arrangement is not in contact with any portion of the spout bowl arrangement.

FIG. 7 illustrates the stepped configuration by illustrating the sealing faces 190, 192 of orifice plates 142, 144 (supported by the charging plate support 174 and discharged plate support 178, respectively) axially offset from sealing face 188 of orifice plate 122 (supported by the operating plate support 176).

To facilitate further ease of transitioning the orifice plates 122, 142, 144 into and out of the operating plate region 150, at least the end most clamps that are adjacent the charging plate support 174 and discharged plate support 178 are tapered to compensate for the different offset distances D1, D2 and D3.

Figure 8:
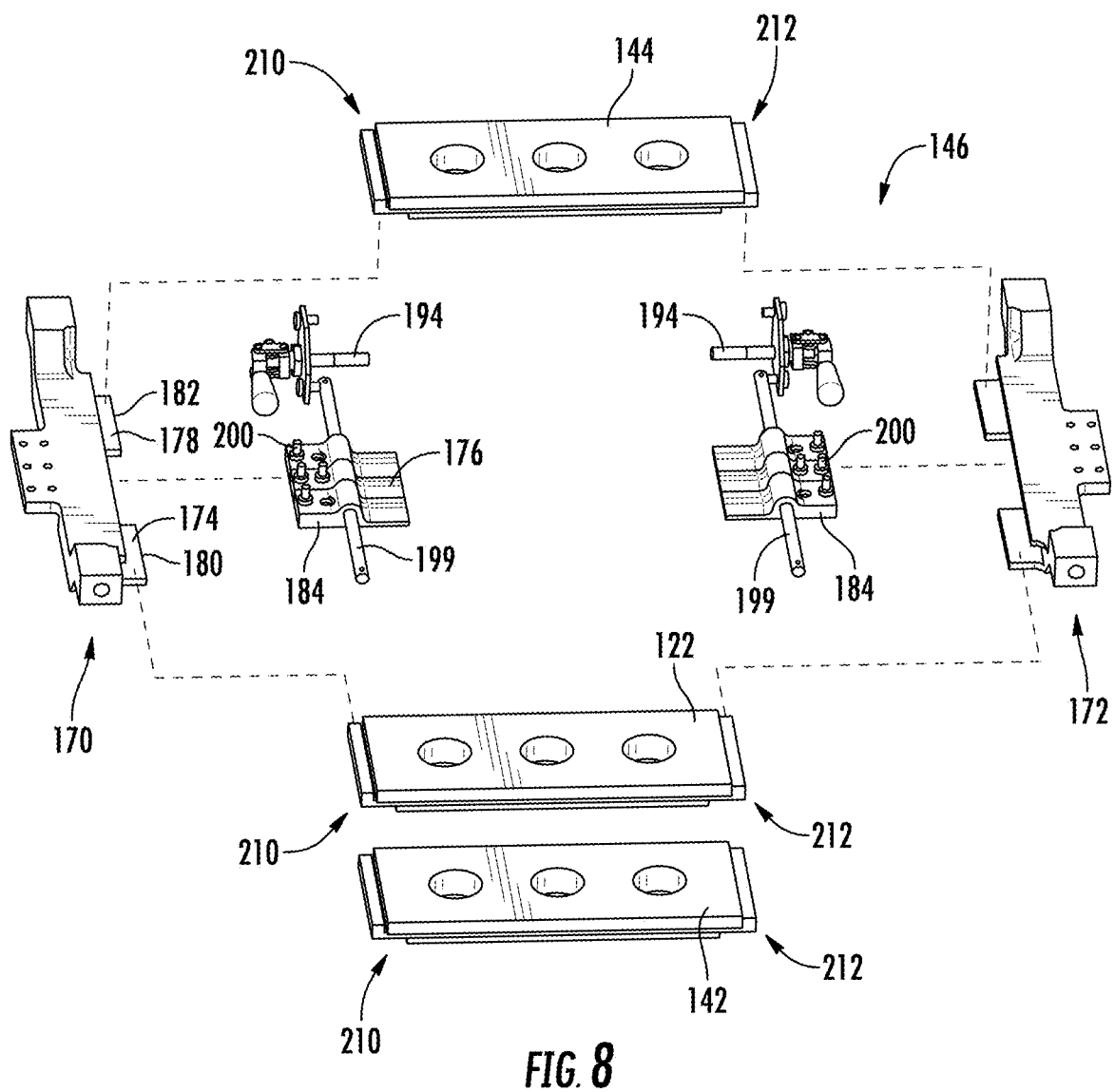
FIG. 8 is a perspective, partially exploded illustration of a plurality of orifice plates and corresponding guide tracks of the guide arrangement.

Clamps 184 are adjustable to allow for the adjustment in the distance D2 between the clamps and the orifice ring sealing face 186. This allows for different thickness orifice plate to be used and/or different levels of biasing to be provided by the operating plate support 176. In this example, the clamps 184 are pivotally mounted on shafts 199. Adjustment members 200 can be threaded into or out of the clamps 184 to pivot the clamps 184 about the shafts 199 to adjust distance D2. FIG. 8 further illustrates clamps 184, shafts 199 and adjustment members 200. In other embodiments, the clamps may be spring loaded such that a spring acts on the clamps on a side opposite of shafts 199 to bias the other side of the clamps towards the spout bowl arrangement. To adjust the force provided by the clamps, the springs would be replaced. In such an arrangement, the illustrated adjustment members 200 would simply guide the springs.

The guide arrangement 146 includes an orifice plate stop 194 adjacent the discharged plate support 178 of each of the first and second guide tracks 170, 172. These orifice plate stops 194 limit the motion of an orifice plate as it is being transitioned into the discharged plate region 152. In doing so, the orifice plate stop 194 can also be used to properly register the adjacent, and now, operating plate 122 with the orifice ring 118. Once the transition of the orifice plates has completed, e.g. one orifice plate transitions from the charging plate region 148 into the operating plate region 150 and another orifice plate transitions from and out of the operating plate region 150 to the discharged plate region 152, the orifice plate stops 194 can be retracted and the orifice plate (e.g. orifice plate 144 in FIG. 7), can be removed from the guide arrangement 146. This may be done manually or automatically. Further, the orifice plate stops 194 can be retracted manually or automatically. The orifice plate stops 194 in the illustrated embodiment have handles 196 (see FIGS. 4 and 6) that can be used to manually manipulate the orifice plate stops 194.

Again, the transition of the orifice plates just described would occur by extension of plunger 162 of actuator 156 in the direction illustrated by arrow 160 to drive the orifice plates 122, 142, 144 axially along axis 158. Again, actuator 156 is illustrated in FIG. 7 in schematic form.

Figure 9:
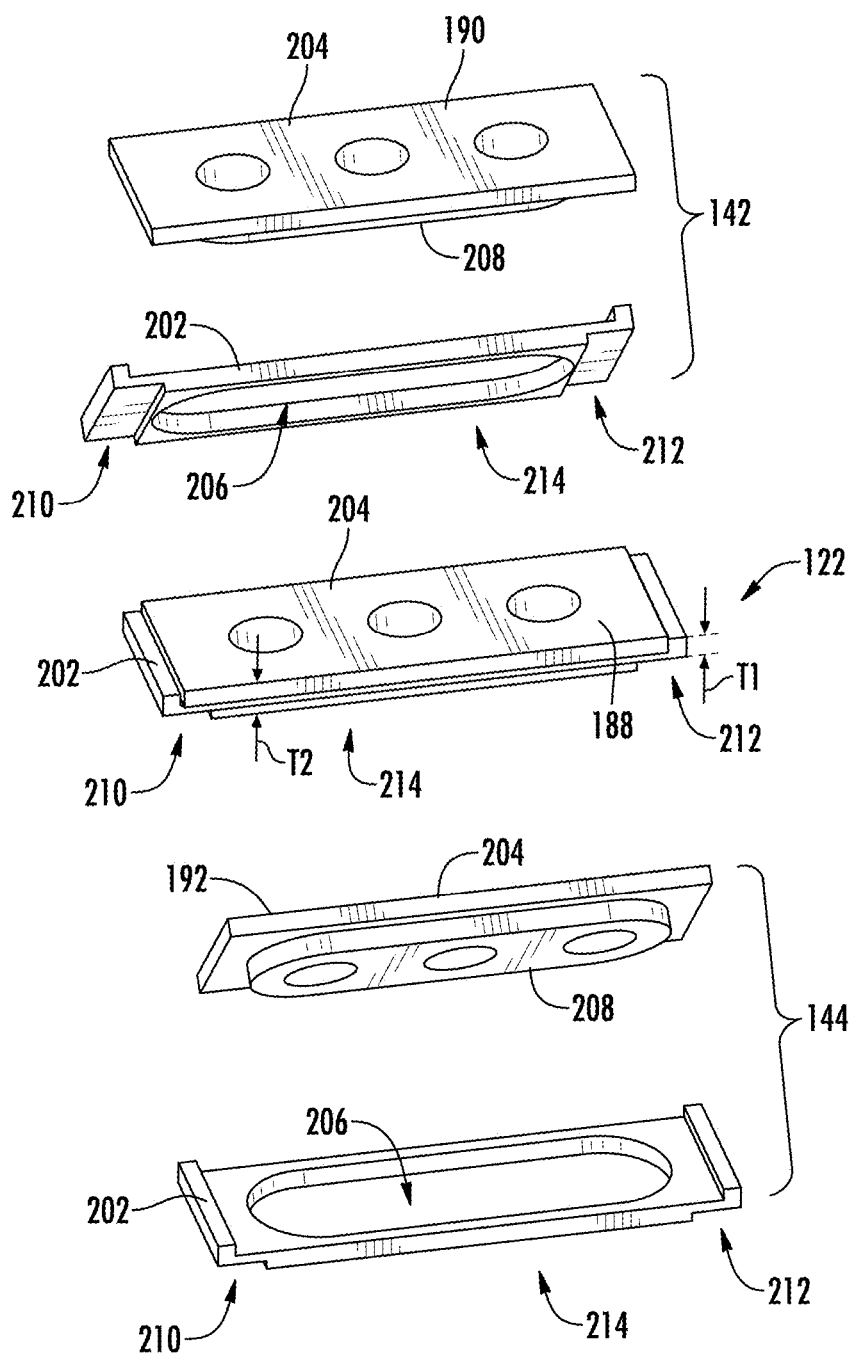
FIG. 9 illustrates the orifice plates of the glass feeding assembly in different orientations and levels of assembly.

FIG. 9 illustrates the three orifice plates 122, 142, 144. Notably, the orifice plates 122, 142, 144 in this example are multicomponent orifice plates. Each orifice plate 122, 142, 144 includes a support member 202, which may be a pan member in some embodiments, that carries an orifice member 204, which may be referred to as a plate member or a refractory plate. In the illustrated example, the support members 202 are identical. The orifice members 204 are similar but have different orifices formed therein (e.g. different diameters). The multicomponent orifice plates may also include optional insulation.

Each support member 202 defines an alignment aperture 206 that receives an alignment projection 208 of the corresponding orifice member 204 in mating fashion to align the two components.

The orifice plates 122, 142, 144 have opposed slide regions 210, 212. The slide regions 210, 212 cooperate with the first and second guide tracks 170, 172 and allow for sliding motion of the orifice plates 122, 142, 144 along the guide tracks 170, 172. In particular, one of the slide regions 210 is supported by one of the guide tracks 170 while the other slide region 212 is supported by the other one of the guide tracks 172.

In the illustrated example, the support member 202 provides the slide regions 210, 212. Thus, when assembled and installed in the guide arrangement 146, the support member 202 is interposed between the orifice member 204 and the guide arrangement 146 and is slidable relative to the guide arrangement 146. However, in a one-piece arrangement, the slide regions could be provided by the orifice member 204, e.g. by the refractory plate itself.

In addition to slide regions 210, 212, the orifice plates 122, 142, 144 have a central region 214 interposed between the opposed slide regions 210, 212. The orifices of the orifice plates 122, 142, 144 are formed through the central regions 214.

The orifice member 204 provides the orifice plate sealing surfaces 188, 190, 192 of the corresponding orifice plate 122, 142, 144 on a first side of the orifice plate 122, 142, 144.

Notably, the first and second slide regions 210, 212 have a first thickness T1 between the first side of the orifice plate and the opposed side thereof. The central region 214 has a second thickness T2 between the first and second sides of the orifice plate. In this example, the first thickness T1 is less than the second thickness such that the central region 214 is thicker than the slide regions 210, 212. This provides a stepped configuration between the slide region 210 and the central region 214 as well as between slide region 212 and central region 214.

The orifice ring 118 is carried by an orifice ring mounting arrangement 219 that includes an orifice ring mounting 220 that directly carries the orifice ring 118.

To prevent molten glass from leaking between the orifice ring sealing face 186 and the orifice plate sealing faces 188, 190, 192 both in use and during a change operation that changes which orifice plate 122, 142, 144 is registered with the orifice ring 118, significant axial force must be applied between the orifice ring 118 and the registered orifice plate 122, 142, 144. Again, this force is provided by the guide arrangement 146.

With reference to FIG. 7, to account for the significant loading applied to the orifice ring 118, the orifice ring mounting pan 220 includes an orifice ring support flange 222. The orifice ring 118 includes an orifice ring abutment 224 that axially abuts the orifice ring support flange 222. When assembled, the orifice ring support flange 222 is positioned axially between the orifice ring abutment 224 and an end of the spout 110. As such, at least part of the axial loading of the orifice ring 118 by a registered orifice plate by the guide arrangement 146 is transferred from the orifice ring 118 to the orifice ring mounting pan 220 via the axial engagement between the orifice ring abutment 224 and orifice ring support flange 222.

Figure 10:
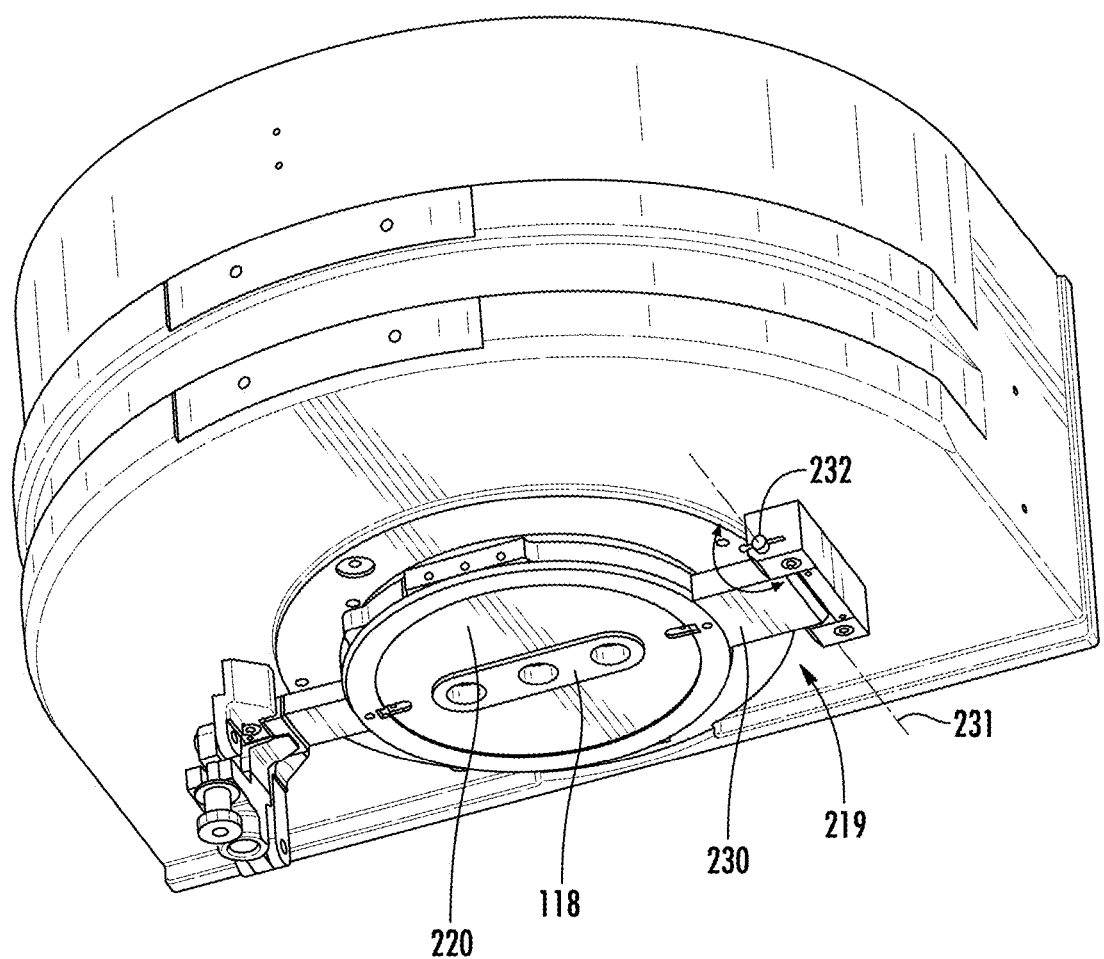
FIG. 10 is a bottom, partial, perspective view of the glass feeding assembly of FIG. 1 having the orifice plate change system removed to show orifice ring and orifice ring mounting arrangement.

In this example, the orifice ring mounting arrangement 219 includes a pivoting swing arm 230 that pivots about a pivot axis 231 defined by pin 232. The swing arm 230 pivots to allow for removal of or replacement of the orifice ring 118. When in the orientation illustrated in FIG. 10, the swing arm 230 secures the orifice ring 118 in its operational state relative to the spout 110.

The orifice ring mounting pan 220 may be part of or is otherwise affixed to the swing arm 230. As such, loading applied by the orifice plates 122, 142, 144 to the orifice ring 118 may be transferred from the orifice ring mounting pan 220, via orifice ring support flange 222 and orifice ring abutment 224, to the swing arm 230.

In some embodiments, the orifice ring mounting pan 220 includes a second orifice ring support flange 233 that axially cooperates with a second orifice ring abutment 235. The first and second orifice ring support flanges 222, 233 may be formed from a single component or separate components. However they are preferably fixed relative to one another.

Figure 11:
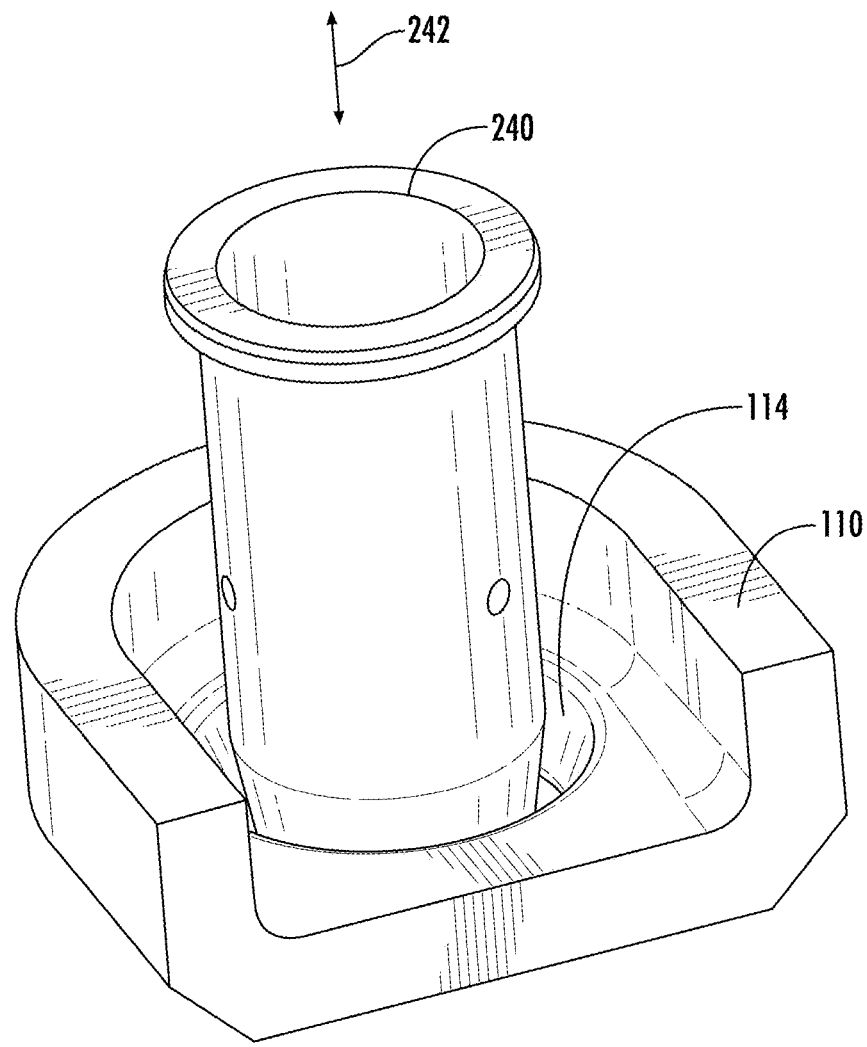
FIG. 11 is a partial perspective view of the spout and a flow control member of the glass feeding assembly of FIG. 1.

With reference to FIG. 11, the glass feeding assembly 100 includes a glass flow control member 240 within spout 110. In FIG. 11, the flow control member 240 is illustrated generically as a flow control tube. However, in some embodiments, one or more plungers may be located within the flow control tube. A representative example of such flow control tube and plungers is illustrated in U.S. Pat. No. 4,554,000, the teachings and disclosures thereof are incorporated herein in their entireties. The glass flow control member 240 is linearly actuatable as illustrated by arrow 242 toward or away from throat 114 to limit the flow of molten glass into and through throat 114. The flow control member 240, in at least one configuration, stops the flow of molten glass through the throat 114 and the orifice ring 118 as well as any registered orifice plate.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An orifice plate change system for changing an orifice plate that is registered with an spout bowl arrangement, the spout bowl arrangement having a first spout bowl arrangement orifice and an spout bowl arrangement sealing face surrounding the first spout bowl arrangement orifice, the orifice plate change system comprising:
   a guide arrangement having a charging plate region and an operating plate region;
   a plurality of orifice plates, each orifice plate having at least one orifice and an orifice plate sealing face configured to seal with the spout bowl arrangement sealing face, each orifice plate being configured to be slidably carried by the guide arrangement and slidable relative to the guide arrangement between the charging plate region in which the orifice thereof is offset from the spout bowl arrangement orifice and the operating plate region in which the orifice thereof is registered with the spout bowl arrangement orifice, the plurality of orifice plates including:
      a first orifice plate having a first orifice;
      a second orifice plate having a second orifice, the second orifice being different than the first orifice such that a stream of molten glass that passes through the second orifice will have a different physical characteristic than a stream of molten glass passing through the first orifice; and
   an actuator configured to translate, operably, an orifice plate from the charging plate region to the operating plate region along a translation axis;
   wherein:
      the charging plate region has a charging plate support that acts on an orifice plate when the orifice plate is located within the charging plate region, the charging plate region provides a first biasing force generally orthogonal to the spout bowl arrangement sealing face to an orifice plate located within the charging plate region;
      the operating plate region has an operating plate support that acts on an orifice plate when the orifice plate is located within the operating plate region, the guide arrangement provides a second biasing force generally orthogonal to the spout bowl arrangement sealing face to an orifice plate located within the operating plate region, the second biasing force being parallel to and greater than the first biasing force, the second biasing force biasing the orifice plate sealing face of the orifice plate located therein into abutment with the spout bowl arrangement sealing face.

2. The orifice plate change system of claim 1, wherein:
   the charging plate support is offset a first distance away from the spout bowl arrangement sealing face; and
   the operating plate support is offset a second distance away from the spout bowl arrangement sealing face, the second distance being less than the first distance.

3. The orifice plate change system of claim 2, wherein:
   the guide arrangement includes a discharged plate region, the operating plate region being positioned laterally between the charging plate region and the discharged plate region, the discharged plate region having a discharged plate support that acts on an orifice plate when the orifice plate is located within the discharged plate region, the discharged plate support is offset a third distance away from the spout bowl arrangement sealing face, the third distance being greater than the second distance, the orifice plates being removable from the guide arrangement from the discharged plate region.

4. The orifice plate change system of claim 2, wherein the second distance is adjustable to adjust a biasing force the operating plate region of the guide arrangement applies to an orifice plate located within the operating plate region biasing the orifice plate into sealing engagement with the spout bowl arrangement.

5. The orifice plate change system of claim 1, wherein:
the guide arrangement includes first and second guide tracks that are laterally spaced apart, each of the first and second guide tracks forming part of the charging plate support and part of the operating plate support; and
the first and second guide tracks straddling the spout bowl arrangement orifice.

6. The orifice plate change system of claim 5, wherein:
each of the first and second guide tracks includes a fixed rail portion forming at least part of the charging plate support; and
each of the first and second guide tracks includes a plurality of clamps forming at least part of the operating plate support.

7. The orifice plate change system of claim 6, wherein the plurality of clamps of each of the first and second guide tracks includes a first clamp, the first clamp being positioned adjacent the charging plate support, the first clamp having a tapered region that transitions between the offset distance provided by the charging plate support and offset distance provided by the operating plate support.

8. The orifice plate change system of claim 5, wherein each orifice plate has opposed first and second slide regions and a central region interposed between first and second slide regions, the orifice of the orifice plate extending through the central region, the first slide region slidably supported by the first guide track and the second slide region slidably supported by the second guide track.

9. The orifice plate change system of claim 8, wherein each orifice plate has a first side that provides the sealing face and a second side opposed to the first side, the first slide region having a first thickness between the first and second sides, the second slide region having a second thickness between the first and second sides, the central region having a third thickness between the first and second sides, the third thickness being greater than the first and second thicknesses such that the first slide region and the central region form a stepped configuration and the second slide region and the central region form a stepped configuration.

10. The orifice plate change system of claim 9, wherein each orifice plate has a support member that carries an orifice member, the orifice member providing the orifice of the orifice plate, the support member providing portions of the first and second slide regions that engage the guide arrangement.

11. The orifice plate change system of claim 1, wherein:
when an orifice plate of the plurality of orifice plates is located within the operating plate region and another orifice plate of the plurality of orifice plates is located within the charging plate region, actuation of the actuator to translate the orifice plate within the charging plate region to the operating plate region biases the orifice plate within the charging plate region into the orifice plate within the operating plate region and pushes the orifice plate within the operating plate region out of the operating plate region.

12. The orifice plate change system of claim 1, wherein:
the first orifice plate includes a plurality of first orifices offset from one another along a first orifice offset axis that is generally orthogonal to the translation axis; and
the second orifice plate includes a plurality of second orifices offset from one another along a second orifice offset axis that is generally orthogonal to the translation axis.

13. The orifice plate change system of claim 1, wherein each orifice plate has a plurality of orifices, a number of the plurality of orifices being equal to a number of orifices in the spout bowl arrangement.

14. The orifice plate change system of claim 1, wherein the charging plate region does not bias the orifice plate therein into contact with the spout bowl arrangement.

15. A glass feeding assembly for feeding a stream of molten glass to a shear assembly, the shear assembly configured to shear the stream of molten glass into a stream of gobs of glass, the glass feeding assembly comprising:
a spout bowl arrangement having a reservoir for holding molten glass, the spout bowl arrangement having at least one spout bowl arrangement orifice, the spout bowl arrangement having a spout bowl arrangement sealing face;
an orifice plate change system of claim 1, for each orifice plate, when the orifice plate is located within the operating plate region, the guide arrangement biases the orifice plate sealing face thereof into sealing engagement with the spout bowl arrangement sealing face.

16. The glass feeding assembly of claim 15, wherein the spout bowl arrangement includes:
a spout and an orifice ring downstream from the spout, the spout providing, at least in part, the reservoir; and
an orifice ring downstream from the spout, the orifice ring having at least one orifice ring orifice that provides the spout bowl arrangement orifice, the orifice ring having an orifice ring sealing face that provides the spout bowl arrangement sealing face.

17. The glass feeding assembly of claim 16, further comprising a orifice ring mounting pan carrying the orifice ring and securing the orifice ring adjacent the spout, the orifice ring mounting pan having an orifice ring support flange;
wherein:
molten glass flows through the orifice ring orifice in a flow direction, the orifice ring having an orifice ring abutment facing opposite the flow direction, the orifice ring sealing face facing opposite the orifice ring abutment, the orifice ring abutment of the orifice ring axially abutted against the orifice ring support flange of the orifice ring mounting pan;
wherein the guide arrangement of the orifice plate change system biases an orifice plate within the operating plate region into the orifice ring sealing face and biases the orifice ring abutment into axial abutment with the orifice ring support flange.

18. The glass feeding assembly of claim 17, wherein the orifice ring support flange is positioned between the spout and the orifice ring abutment.

19. The glass feeding assembly of claim 15, further comprising a flow control member positioned within the reservoir, the flow control member movable within the spout bowl arrangement to adjust the flow of molten glass through the at least one spout bowl arrangement orifice, the flow control member having a configuration in which the flow control member stops flow of molten glass from the spout bowl arrangement and any registered orifice plate.

20. An orifice plate change system for changing an orifice plate that is registered with an spout bowl arrangement, the spout bowl arrangement having a first spout bowl arrangement orifice and an spout bowl arrangement sealing face surrounding the first spout bowl arrangement orifice, the orifice plate change system comprising:

a guide arrangement having a charging plate region and an operating plate region;

a plurality of orifice plates, each orifice plate having at least one orifice and an orifice plate sealing face configured to seal with the spout bowl arrangement sealing face, each orifice plate being configured to be slidably carried by the guide arrangement and slidable relative to the guide arrangement between the charging plate region in which the orifice thereof is offset from the spout bowl arrangement orifice and the operating plate region in which the orifice thereof is registered with the spout bowl arrangement orifice, the plurality of orifice plates including:

a first orifice plate having a first orifice;

a second orifice plate having a second orifice, the second orifice being different than the first orifice such that a stream of molten glass that passes through the second orifice will have a different physical characteristic than a stream of molten glass passing through the first orifice; and an actuator configured to translate, operably, an orifice plate from the charging plate region to the operating plate region along a translation axis; and wherein each orifice plate of the plurality of orifice plates includes a pan member and a plate member, the plate member defining the orifice, the pan member is interposed between the plate member and the guide arrangement, the pan member being slidable relative to the guide arrangement, the plate member being removable from the pan member, the plate member aligns with the pan member in mating fashion.

21. An orifice plate change system for changing an orifice plate that is registered with an spout bowl arrangement, the spout bowl arrangement having a first spout bowl arrangement orifice and an spout bowl arrangement sealing face surrounding the first spout bowl arrangement orifice, the orifice plate change system comprising:

a guide arrangement having a charging plate region and an operating plate region;

a plurality of orifice plates, each orifice plate having at least one orifice and an orifice plate sealing face configured to seal with the spout bowl arrangement sealing face, each orifice plate being configured to be slidably carried by the guide arrangement and slidable relative to the guide arrangement between the charging plate region in which the orifice thereof is offset from the spout bowl arrangement orifice and the operating plate region in which the orifice thereof is registered with the spout bowl arrangement orifice, the plurality of orifice plates including:

a first orifice plate having a first orifice;

a second orifice plate having a second orifice, the second orifice being different than the first orifice such that a stream of molten glass that passes through the second orifice will have a different physical characteristic than a stream of molten glass passing through the first orifice; and an actuator configured to translate, operably, an orifice plate from the charging plate region to the operating plate region along a translation axis; and wherein the first orifice plate has a first number of orifices and the second orifice has a second number of orifices, the second number of orifices being different than the first number of orifices.

22. An orifice plate change system for changing an orifice plate that is registered with an spout bowl arrangement, the spout bowl arrangement having a first spout bowl arrangement orifice and an spout bowl arrangement sealing face surrounding the first spout bowl arrangement orifice, the orifice plate change system comprising:

a guide arrangement having a charging plate region and an operating plate region;

a plurality of orifice plates, each orifice plate having at least one orifice and an orifice plate sealing face configured to seal with the spout bowl arrangement sealing face, each orifice plate being configured to be slidably carried by the guide arrangement and slidable relative to the guide arrangement between the charging plate region in which the orifice thereof is offset from the spout bowl arrangement orifice and the operating plate region in which the orifice thereof is registered with the spout bowl arrangement orifice, the plurality of orifice plates including:

a first orifice plate having a first orifice;

a second orifice plate having a second orifice, the second orifice being different than the first orifice such that a stream of molten glass that passes through the second orifice will have a different physical characteristic than a stream of molten glass passing through the first orifice; and an actuator configured to translate, operably, an orifice plate from the charging plate region to the operating plate region along a translation axis;

a stop plate that is free of any orifices to stop the flow of molten glass when aligned with spout bowl arrangement orifice.

* * * * *